April 21, 1953     T. W. PAUL     2,635,365
HITCH MECHANISM FOR ROLL-OVER SCRAPERS
Filed Dec. 13, 1946     4 Sheets-Sheet 2
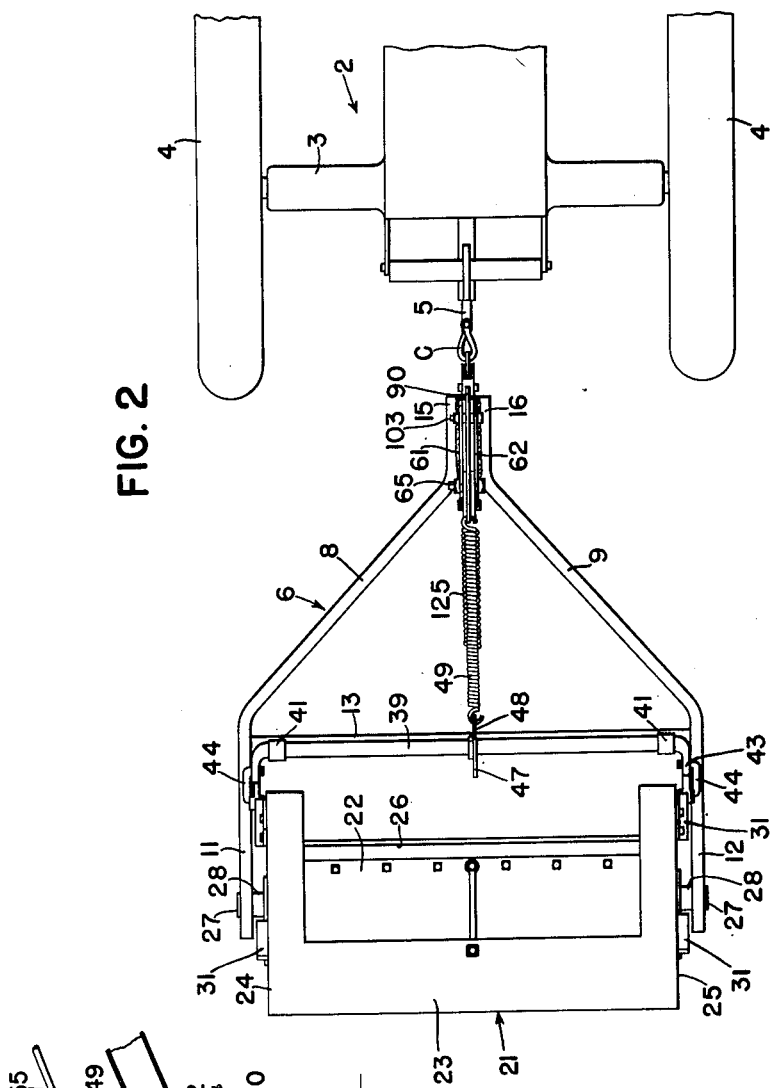
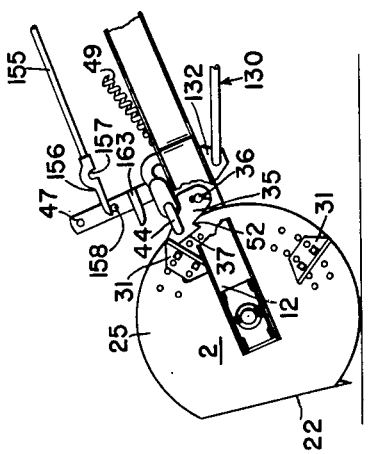
INVENTOR
TALBERT W. PAUL
BY
ATTORNEYS

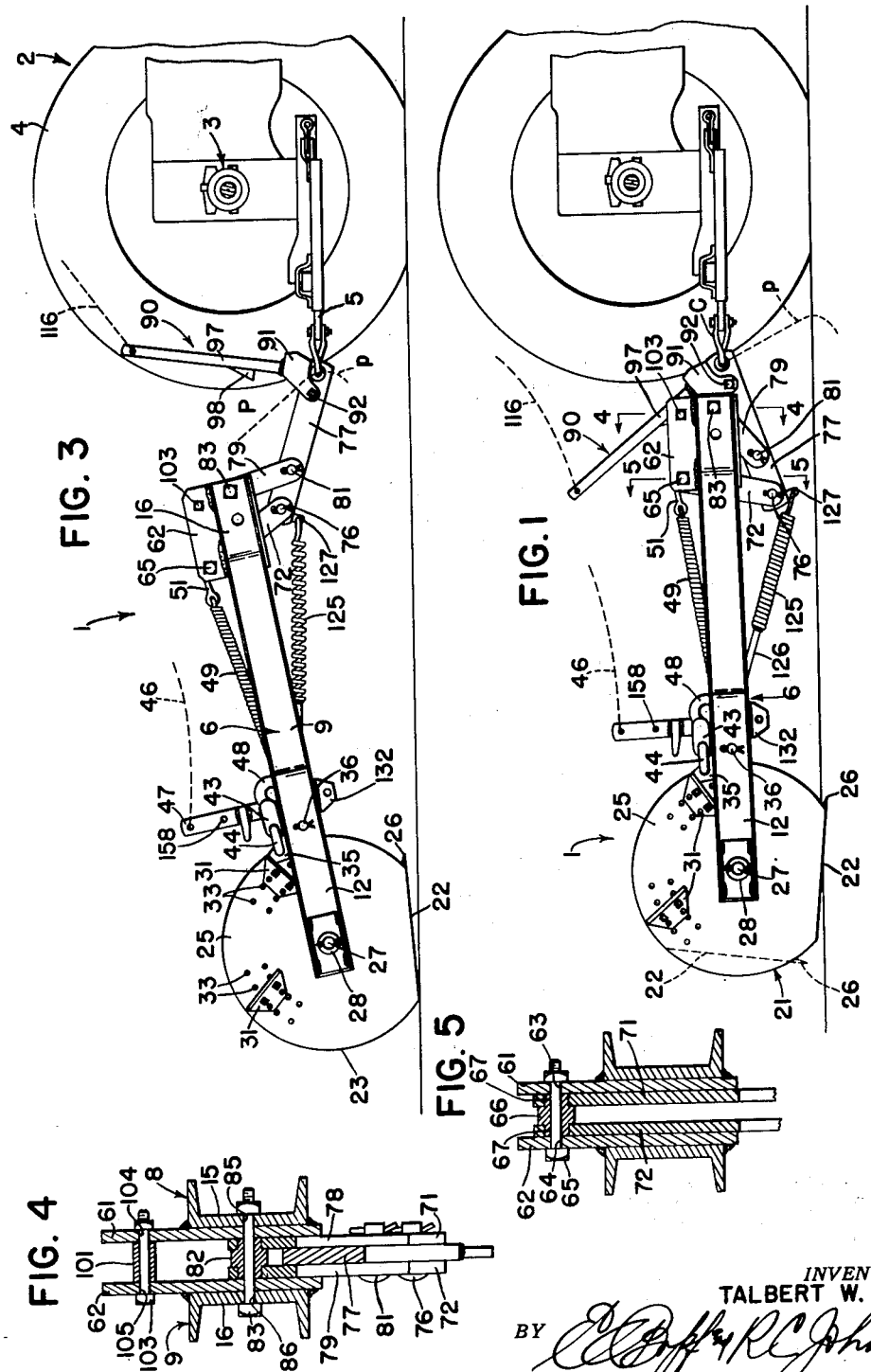

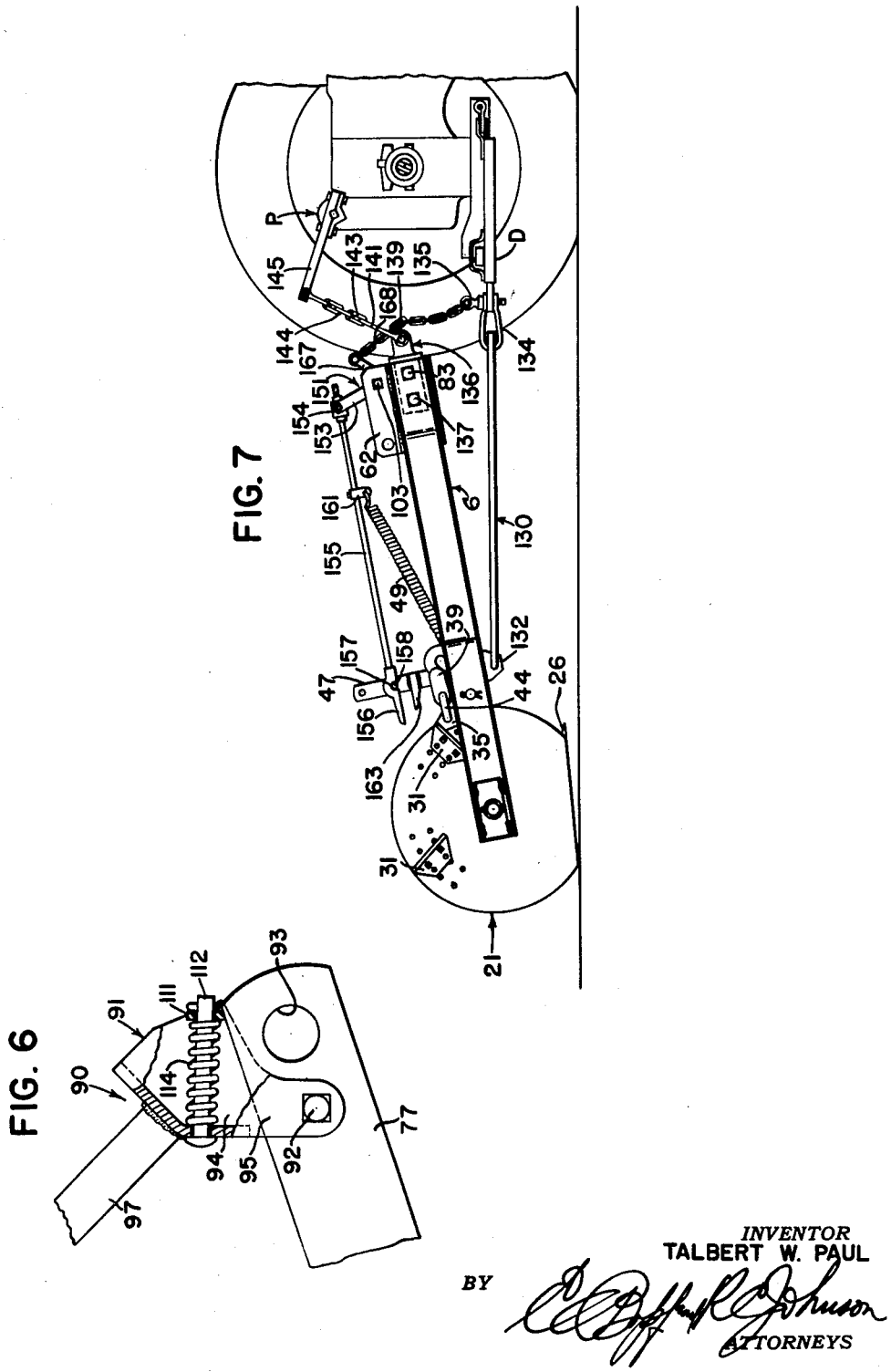

April 21, 1953  T. W. PAUL  2,635,365
HITCH MECHANISM FOR ROLL-OVER SCRAPERS
Filed Dec. 13, 1946  4 Sheets-Sheet 4
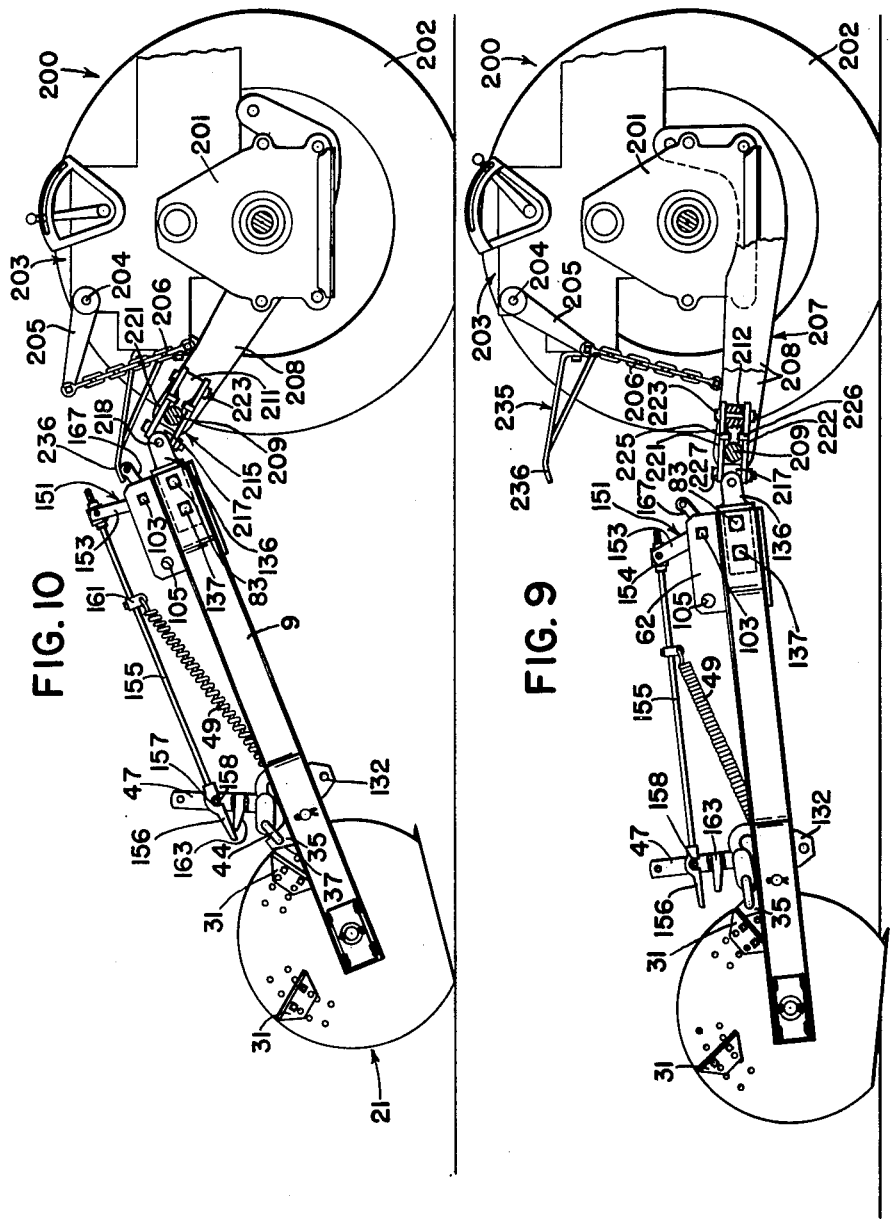
INVENTOR
TALBERT W. PAUL
BY
ATTORNEYS Patented Apr. 21, 1953

2,635,365

UNITED STATES PATENT OFFICE 2,635,365

HITCH MECHANISM FOR ROLL-OVER SCRAPERS

Talbert W. Paul, Moline, Ill., assignor to Deere & Company, Moline, Ill., a corporation of Illinois Application December 13, 1946, Serial No. 715,959

4 Claims. (Cl. 37—140)

The present invention relates generally to agricultural implements and more particularly to ground working implements such as scrapers, levelers and the like.

The object and general nature of the present invention is the provision of a new and improved scraper of the rotary or roll over type, particularly adapted for tractor operation and easily and conveniently controlled by the operator of the tractor. More specifically, it is an important feature of this invention to provide a rotary or roll over scraper wherein different types of hitches and/or controlling mechanisms are accommodated and wherein such revisions may be made easily and quickly to accommodate the scraper to different tractors with only a minimum of auxiliary parts.

Another important feature of the present invention is the provision of a rotary or roll over scraper wherein the draft power is utilized for shifting the scraper bowl from cutting position to transport position by a simple latch mechanism and wherein the change from cutting to transport position may be made without excessive jar or shock to the scraper, the tractor or the operator controlling them. More particularly, it is a feature of this invention to provide a scraper having a hitch member, adapted to receive draft from a propelling tractor or the like, and connections between the hitch member and the scraper frame wherein, when the hitch member is released for movement relative to the frame, the hitch member shifts without jar or shock to such a position as to cause the front end of the scraper frame to be elevated so as to elevate the bowl into its transport position. More specifically, it is a feature of this invention to provide a pair of non-parallel links connecting the hitch member and the front end of the scraper frame so that, when the hitch member is released, the link members cause the hitch member to swing automatically into a position raising the front end of the scraper frame but without the provision of stops or the like, whereby shocks are eliminated.

Another important feature of the present invention is the provision of a rotary scraper particularly adapted for use with tractors having a power operated part, such as a power unit, power lift, or the like, and wherein the angle of the cutting portion of the scraper bowl may be varied as desired by suitable operation of the tractor power lift, and still further, it is another feature of this invention to provide means for automatically releasing or unlatching the bowl, relative to the scraper frame, in response to the elevation of the scraper frame to a given point, relative to the tractor, whereby the latch mechanism is automatically released, permitting the bowl to rotate, dump its load and level the same, all while the outfit is moving forwardly.

These and other objects and advantages of the present invention will be apparent to those skilled in the art after a consideration of the following detailed description of the preferred forms of the present invention, illustrated in the accompanying drawings.

In the drawings:

Figure 1 is a side view of one form of the present invention, embodying a rotary or roll over scraper adapted to be connected to any type of farm tractor having a drawbar.

Figure 2 is a plan view of the scraper shown in Figure 1, Figures 1 and 2 showing the scraper in its operating or scraping position.

Figure 3 is a side view, similar to Figure 1, showing the scraper in its transport position.

Figures 4 and 5 are fragmentary sectional views, taken generally along the lines 4—4 and 5—5 of Figure 1.

Figure 6 is a detail sectional view of the hitch latch.

Figure 7 is a side view of the scraper shown in Figure 1, modified to accommodate its connection to a tractor having a power lift unit and embodying connections whereby operation of the tractor power lift unit not only controls the cutting angle of the blade but also automatically controls the tripping of the scraper bowl to permit its movement from scraping or transport position to a dumping position.

Figure 8 is a fragmentary view, similar to Figure 7, showing the scraper frame in an elevated position and illustrating the action of the automatic bowl tripping mechanism.

Figure 9 is a side view showing a rotary scraper, constructed according to the principles of the present invention, attached to a tractor having a drawbar and power lift mechanism connected with the drawbar for raising and lowering the same.

Figure 10 is a view similar to Figure 9, showing the bowl in its transport position.

Referring now more particularly to Figures 1 and 2, the rotary roll over scraper of the present invention is indicated in its entirety by the reference numeral 1 and is shown as connected to a tractor 2 of more or less conventional construction, the tractor including a rear axle structure 3 carrying axle shafts on which rear traction wheels 4 are mounted. The tractor 1 includes a drawbar 5 to which various kinds of implements may be hitched as desired. The scraper 1 includes a generally longitudinally extending scraper frame 6 which preferably comprises generally rearwardly diverging frame bars 8 and 9 having rear parallel sections 11 and 12 connected together by a suitable cross member 13. Preferably, the members 8, 9 and 13 are in the form of channels welded or otherwise fixedly connected, and the forward ends of the channels 8 and 9 converge forwardly, terminating in parallel hitch sections 15 and 16. The rear end portions 11 and 12 of the frame bars 8 and 9 are disposed on opposite sides of a scraper bowl 21 which preferably comprises a generally flat lower wall 22, a curved back wall 23, and end walls 24 and 25, preferably welded together to form a rigid structure. The forward portion of the bottom wall 22 carries a blade section 26 forming a cutting edge for the bowl 21. Each of the end walls carries a stud 27 which is received in a bearing sleeve 28 formed on or carried by the rear end portions 11 and 12 of the frame channels. In this manner the bowl 21 is capable of rolling or pivotal action relative to the frame 6 about a generally transverse axis. Each end wall of the bowl carries two or more stop or abutment members 31 preferably secured by bolts or the like to the end walls, and to provide for fastening the stop members 31 in different positions, the end walls 24 and 25 are provided with a plurality of apertures 33 to receive the bolts for fastening the stop members 31 in different positions.

For controlling the position of the bowl 21 relative to the frame 6, a latch member 35 is pivotally connected, as at 36, to the end portion of each of the frame channels and is so mounted that the latch members or detents 35 may be moved into a position to abuttingly receive the associated stop members 31 whereby, when the outfit moves forwardly, rolling or rotation of the bowl 21 is prevented, the same being held in a cutting or loading position, for example, as shown in Figure 1. The two latch members 35 are controlled by means of a rockshaft 39 mounted for rocking movement in a pair of brackets 41 secured, as by bolts or the like, to the cross channel 13, and secured to each end of the shaft 39 is a short arm 43 that is connected by a link 44 to the associated latch member 35, each link 44 being pivotally connected to the arm 43 and latch 35 whereby when the rockshaft 39 is swung in a clockwise direction, as viewed in Figure 1, the latches 35 are withdrawn from the bowl abutment or stop members 31, permitting the bowl to rotate to its dumping and leveling position (dotted lines, Figure 1). In this form of the invention the shaft 39 is rocked by means of a cable or rope 46 that extends from the tractor seat downwardly and rearwardly to an arm 47 that is fixed at its lower end to the central portion of the shaft 39. An auxiliary arm 48 is fixed to the rockshaft 39, preferably on the forward side thereof, and is curved to clear the upper flange of the cross channel 13. The lower or outer end of the arm 48 receives the rear end of a biasing spring 49, the forward end of which is connected by any suitable means, such as a hook 51 or the like, to an adjacent portion of the frame. It will be noted that the arms 43 are disposed above the rear portions of the frame channels, the arms 43 being formed so that when they engage the frame channels the pivot points of the arms and links 43 and 44 are such that they establish an over-center lock holding the latch arms 35 in their bowl-engaging position, yet it requires very little effort to swing the arm 47 forwardly for pulling the latch member 35 away from the bowl abutment members 31, as for dumping the bowl or the like.

By pulling on the cable 46 to release the latches and then almost immediately releasing the cable, the spring 49 will move the detents 35 back into their engaging position, holding the bowl in the position shown in Figure 8 for the purpose of spreading or leveling the load after it has been dumped. In order to provide for use of the scraper as a rearwardly acting bull dozer, each of the latch members 35 is provided with a detent notch 52 whereby, when the bowl is in its spreading position, all the operator has to do to prevent the bowl from being rotated backwardly when the outfit is backed, is to momentarily pull the cable 46, which permits the second pair of abutments 31 to move forward of the latches 35 and in a position to be brought back against the notches 51 of the latches 35 when the outfit is backed.

Referring now more particularly to Figures 1, 3, 4 and 5, it will be seen that a pair of vertical plates 61 and 62 are secured to the front end portions 15 and 16 of the frame channels, preferably on the inside thereof whereby the upper portions of the plates 61 and 62 extend above the channels. The plates 61 and 62 are secured to the channels preferably by welding but they may be secured thereto in any suitable way, as by bolts, rivets, or the like. A pair of upper rear registering openings 63 and 64 are formed in the vertical plates 61 and 62, and these openings receive a bolt 65 about which is disposed a spacing sleeve 66. The spacing sleeve 66 has end bearing sections 67 which receive the upper apertured ends of a pair of generally downwardly extending link members 71 and 72. The lower ends of the links 71 and 72 are apertured to receive a pivot pin 76 on which the rear end of a hitch member 77, disposed between the lower ends of the links 71 and 72, is carried. A forward pair of link members 78 and 79 are pivoted, as by a pivot pin 81, to the longitudinal hitch member 77. The upper ends of the forward link members 78 and 79 are apertured and are mounted on bearing sections of a spacer 82 that is disposed between the lower portions at the front of the frame plates 61 and 62, the spacer 82 being carried on a bolt 83 or the like that passes through registering apertures 85 and 86 formed in the front end of the frame bars 8 and 9 and the adjacent portions of the vertical hitch plates 61 and 62. It will be noted that the links 71, 72 and 78, 79 are so pivotally connected to the scraper frame and hitch member 77 that they lie in non-parallel relation. This particular arrangement will be described below.

A detent member 90 is pivotally mounted on the forward end of the hitch member 77 and engages a portion of the scraper frame 6 for locking the hitch member in an upper position relative to the frame. The latch or detent member 90 comprises a lower yoke section 91 pivoted, as at 92, to the forward end of the hitch member 77, just rearwardly of the opening 93 therein, at which point the scraper is adapted to be connected to a propelling tractor, as by a clevis C or the like. The yoke member 91 includes two side portions 94 and 95 apertured to receive the pivot pin 92 and arranged to lie on opposite sides of the hitch member 77. A shank or extension 97, preferably comprising a strap, is welded at its lower portion to the yoke member 91 and carries a detent or abutment section 98 which, when the hitch member 77 is to be locked in an upper position relative to the frame 6, engages over a spacer 101 disposed between the upper forward portions of the vertical hitch plates 61 and 62 and is mounted on a bolt 103 which passes through registering openings 104 and 105 formed in the forward ends of the plates 61 and 62. It will be noted that the bolts 65, 83 and 103 serve not only to form the desired pivots or abutment members for the cooperating parts, but in addition such bolts serve also to rigidly connect the forward portions of the frame channels together. A lug 111 is formed on the forward end of the hitch member 77 and is apertured to receive a bolt or pin 112 that extends through an opening in the rear section of the yoke 91 and which carries a compression spring 114 which bears against the lug 111 and the yoke 91 to yieldingly hold the lug or stop 98 engaged over the cooperating member 101 carried by the scraper frame. The outer end of the extension 97 is apertured to receive a cable 116 that extends forwardly to a point accessible to the operator on the tractor whereby, at will, he may exert a pull on the cable 116 and disengage the lug 98 from the frame spacer or stop member 101. This permits the hitch member 77 to swing downwardly relative to the scraper frame. The links 71, 72 and 78, 79 are so arranged angularly that the point at which draft is applied to the hitch member 77, namely, the opening 93, moves downwardly relative to the scraper frame in a path that extends both downwardly and forwardly until the links move in such position that beyond that point the front end of the hitch members 77 will move downwardly and rearwardly. The path of movement p of the front end of the hitch member is shown in broken lines in Figures 1 and 3. It will be seen from Figure 1 that when the tractor drawbar is connected to the point 93 (Figure 6) on the hitch member 77 and assuming that the detent member 90 is locked to the scraper frame, the forward pull exerted by the tractor on the scraper will propel the same forwardly with the cutting edge 26 of the bowl 21 in an earth-engaging or cutting position, whereby the bowl is rapidly filled with earth. Without stopping the tractor, the operator may at any time terminate the loading or filling action merely by pulling the cable 116 to release the latch 90 from the frame. The forward pull exerted by the tractor on the hitch member 77 will immediately cause the same to swing downwardly and forwardly until it reaches substantially the point where further downward swinging of the hitch member 77 would carry the latter downwardly and rearwardly. However, since the pull on the hitch member 77 is exerted in the forward direction, the hitch member 77, when released by releasing the member 90, will move downwardly to a position, such as is indicated in Figure 3, relative to the scraper frame but will not move beyond this position. Since, as a matter of fact, the forward end of the hitch member 77 is connected to the drawbar of the tractor, which remains at a substantially uniform height above the ground, the forward pull exerted on the hitch member 77 when the member 90 is released serves to elevate the front end of the scraper frame 6 which, as best shown in Figure 3, serves to elevate the cutting edge 26 of the bowl and thus terminates further scraping or loading action. By virtue of the angular relationship between the links, the scraper frame and the hitch member, the latter assumes the raised or transport position without the use of stops, abutments or the like and hence without entailing any impact loads or the like when the frame is permitted to move from its operating or scraping position (Figure 1) into its transport position (Figure 3). The load may subsequently be dumped by pulling on the cable 46, either releasing the same in sufficient time to lock the bowl in its spreading position, or permitting the bowl to roll over, completely dumping the contents therefrom, until it reassumes a cutting position, by the stops 31 reengaging the latch members 35. During this action, the bowl 21 has considerable momentum, and since, being unloaded, the pull is relatively slight, this momentum, which is in addition to the effect of the spring 125, is sufficient when the stops 31 engage the latches 35, to cause the forward end of the frame 6 to be forced downwardly, relatively to the hitch member 77, so that the latch 90 will snap over the abutment spacer 101 without requiring that the operator stop or slow down the tractor. Under severe operating conditions, as when loading uphill, where the momentum of the bowl may not be sufficient to reengage the latch member 90 with the stop spacer 101, I provide a spring 125 acting between the rear end of the hitch member 77 and an adjacent part of the frame, for aiding the return of the scraper to its loading or scraping position (Figure 1). Preferably, the rear end of the spring 125 is connected by a rod 126 to the central portion of the cross frame member 13, and the front end of the spring 125 is connected into an apertured lug 127 secured, as by welding, to the rear portion of the hitch link 77.

A number of farm tractors are provided with some form of power lift unit by which operating units of implements connected thereto may be shifted, raised or lowered by power derived from the tractor. In order to take care of situations of this kind, and particularly to make use of the tractor power lift unit for adjusting the working position of the scraper bowl, I provide a modified set of connections between the scraper and the tractor. Referring now to Figure 7, I provide a draft transmitting bail 130 and connect the same between the tractor drawbar D and a pair of apertured lugs 132 carried on the rear portions of the scraper frame bars 8 and 9. Preferably, the draft member 130 is in the form of a U-shaped or V-shaped bail having its central section loosely received in a clevis 134 connected to the tractor drawbar D by an eye-bolt 135. In order to accommodate the connection between the front end of the scraper frame 6 and the power lift unit of the tractor, which is indicated by the reference character P, I remove the links 71, 72 and 78, 79, together with the hitch member 77 and latch member 90, and in place of these parts I provide a member 136 and secure the same to the forward ends 15 and 16 of the frame channels by any suitable means, such as the bolt 83 and a rear bolt 137 which extends through registering openings formed in the frame channels rearwardly of the openings 85 and 86 that receive the bolt 83, the hitch member 136 having openings receiving the bolts 83 and 137. The forward end of the hitch member 136 is apertured to receive a bolt or pin 139 by which an elongated clevis 141 is connected thereto for swinging movement. A pair of chains 143 and 144 extend upwardly from the clevis 141 to the right and left hand power lift arms 145 that form a part of the tractor power lift unit P.

By virtue of this construction, the forward draft is applied to the scraper frame 6 at a relatively low point which does not interfere with raising or lowering the scraper frame to change the angle of cut, or to lift the cutting edge 26 into a position for transport. Such raising and lowering of the scraper frame 6 is accomplished by operation of the tractor power lift P. Thus, the operator may conveniently increase or decrease the rate of loading earth into the bowl 21, easily and conveniently raise the front end of the scraper frame in order to raise the cutting edge out of contact with the ground, thus arranging the outfit for transport.

In this form of the invention it may be desirable to provide some form of automatic bowl-releasing mechanism whereby, upon raising the front end of the scraper frame to a given position, the latches 35 may automatically be operated so as to dump the load at the desired point, thereby performing all of the control operations of the scraper merely by manipulating the tractor power lift unit P. To this end, I provide a bell crank 151 and mount the same on the spacer 101 between the front portions of the hitch plates 61 and 62. The bell crank 151 includes an upper or rear arm 153 which receives a swivel 154 into which the forward end of a bowl control rod 155 is threaded. The rear end of the rod 155 carries an extension 156 which is provided with a notch 157 that is adapted to engage a stud 158 carried on the arm 47. In this form of the invention the spring 49 is disconnected from the scraper frame 6 and connected to a set screw lug 161 fixed to the control rod 155 so that the spring 49 serves not only to bias the rockshaft 39 for movement in a counterclockwise direction but also to hold the rear end of the control rod 155 down against the lug 158. The bell crank 151 includes a forward arm 167 which is apertured to receive the upper end of a chain 168 that extends downwardly with a certain amount of looseness or slack and is connected at its lower end with the eyebelt 135 that connects the hitch member 130 with the tractor drawbar D. The length of the chain is such that the front end of the frame may be raised and lowered, as desired, to adjust the working position of the bowl and also to raise the scraper into a transport position without operating the bell crank 151. However, when the front end of the scraper frame is raised beyond this point, the chain 168 tightens and swings the bell crank 151 forwardly, which operates the arm 47 and causes the forward movement thereof to disengage the latches 35.

A rearwardly extending arm 163 is fixed to the arm 47 and extends rearwardly therefrom so that when the forward movement of the link 155 swings the arm 47 forwardly, the rear end of the arm 163 engages the rear portion of the part 156 to automatically disengage the same from the stud 158, thereby permitting the spring 49 to swing the latches 35 back into stop-engaging position in time to engage the rear stops 31 on the bolt ends so as to hold the bowl in its leveling or spreading position. To aid in quickly releasing the link 155 from the stud 158 on the arm 47, each detent 35 has a rear bevel portion 37 which is angled so that, as shown in Figure 8, the instant the latches 35 release the stops 31, the bowl 21 starts to rotate and the movement of the abutments 31 acts against the angled sections 37 of the latches 35 to force the latter forwardly, thus rocking the arm 47 forwardly and causing the arm 163 to engage the rear portion of the extension 156 and immediately disconnect the rod 155 from the stud 158.

When it is desired to move the bowl 21 into its working or cutting position, the operator momentarily lowers the scraper frame so as to permit the spring 49 to swing the link 155 and bell crank 151 rearwardly so as to reengage the notch 157 with the stud 158, and then the operator raises the frame so as to release the latches 35 from the rear stops 31. This permits the bowl 21 to roll forwardly until the stops 31 engage the latches 35. The operator then lowers the frame so as to bring the cutting edge 26 into its cutting position, which action permits the spring 49 to swing the link 155 rearwardly and again reenegage the notch 157 with the stud 158. If desired, the cable 46 need not be removed from the upper end of the arm 47 so that at any time the latches 35 may be operated by hand. In this event, it is a relatively simple matter for the operator manually to release the latches 35 from the rear stops 31 and roll the bowl over into its cutting position, without having to raise and lower the scraper frame.

I have described above how the rotary scraper of the present invention is adapted for use with a conventional tractor having provision only for a drawbar connection for trailing implements, and also I have described how the rotary scraper of the present invention may be adapted for use with a tractor having a power lift unit, arranged so that operation of the power lift unit serves to adjust the depth of operation and also serves to raise and lower the scraper into and out of transport position. Another form of tractor which is coming into use involves a vertically swingable bail or drawbar operated by a power lift unit which raises and lowers the drawbar and any implement units connected thereto. I will now describe how the rotary scraper of the present invention is adapted for connection to the latter type of tractor so as to be operated by vertical swinging of the tractor bail or drawbar.

Referring particularly to Figure 9, a tractor of the above mentioned type is indicated in its entirety by the reference numeral 200 and includes a rear axle structure 201 including axle shafts upon which rear drive wheels 202 are fixed. The tractor 200 also includes a power lift unit 203, the latter being provided with a rockshaft 204, arms 205 being fixed to the rockshaft 204 and connected through suitable links 206 to a tractor drawbar 207. The latter member includes side bars 208 that are pivotally connected at their forward points to drop housings that form a part of the rear axle structure 201. A transverse bar 209 is connected rigidly to the side members 208, and centrally the transverse bar 209 is provided with a forward implement-receiving lug 211 that is apertured, as at 212, to receive various implements that are adapted for use with the tractor 200. In order to provide for operation of the rotary scraper of the present invention, I remove the draft links 130 and the lifting parts 139, 141, 143 and 144 from the scraper unit described above and shown in Figures 7–8. Instead of the draft bail 130 (Figure 7), I provide a hitch structure 215 for connecting the front end of the scraper frame 6 directly to the tractor drawbar 207. Such hitch connection may take any suitable form, but preferably I employ a swivel 217 connected by a pin or bolt 218 to the forward end of the hitch member 136, the forward end being bifurcated, and the swivel 217 is disposed between the rear ends of upper and lower hitch strap members 221 and 222. The forward ends of the latter members are apertured to receive a bolt or eye member 223 which connects the straps to the tractor drawbar attachment member 211 and which preferably passes through the aperture 212 in the forward end thereof. In order to prevent the straps 221 and 222 from swinging laterally about the bolt 223, I provide stabilizing lugs 225 and 226 which engage the neck of the attachment lug 211 closely adjacent the cross bar 209. The rear ends of the strap members 221 and 222 are apertured to receive a bolt or pin 227 which connects the members 221 and 222 to the swivel 217 to accommodate lateral swinging of the scraper relative to the tractor, the strap members 221 and 222 being prevented from lateral swinging relative to the tractor by the lugs 225 and 226 as described above. The strap members 221 and 222 are spaced apart to snugly receive the cross bar 209 of the tractor drawbar 207 so that when the latter is raised and lowered, as by actuation of the tractor power lift unit 203, the front end of the scraper frame is raised and lowered. The bolt 227 may, if desired, be replaced by an eyebolt and a chain loosely connected between the eyebolt and the bell crank 167, as described above. However, with this type of tractor, I prefer to mount on the rear portion of the tractor a stationary stop member 235 which includes a rearwardly extending curved section 236 that is disposed substantially over the pivotal connection between the scraper frame and the tractor drawbar. Thus, when the front end of the scraper frame is raised to a given height, the end 167 of the bell crank 151 contacts the stationary stop section 236, which automatically trips the bowl and permits the same to rotate into its next position. Like the chain described above, the stop member 235 constitutes a connection between the tractor and the bell crank on the scraper frame for automatically operating the latches 35 by the raising and lowering of the front end of the scraper frame.

While I have shown and described above the preferred structure in which the principles of the present invention have been incorporated, it is to be understood that my invention is not to be limited to the particular details shown and described above, but that, in fact widely different means may be employed in the practice of the broader aspects of my invention.

What I claim, therefore, and desire to secure by Letters Patent is:

1. An agricultural implement comprising a frame including a pair of rearwardly diverging frame bars, a ground-engaging means pivoted to the rear ends of said frame bars, a pair of vertical plates secured to the forward ends of said frame bars on the inner sides thereof, said plates having a pair of apertures in each, spaced apart generally longitudinally and forming fore and aft spaced apart pairs of apertures, there being an aperture in the front end of each of said frame bars and the adjacent portions of said plate, forming another set of registering apertures, a hitch member, nonparallel link means pivotally connected at their lower ends with said hitch member, means disposed in two of said pairs of registering apertures for swingably supporting the upper portions of said links, the angular relation of said links being such that said hitch member swings downwardly and forwardly, relative to said frame, during one portion of its permissive movement relative to the frame, and then downwardly and rearwardly relative to said frame, a part disposed in the other set of apertures, and a latch member pivoted to the forward end of said hitch member and engageable with said part for releasably locking said hitch member in an upward position relative to said frame.

2. An agricultural implement comprising a frame, a ground-engaging means connected with the rear portion of said frame and having a lower cutting edge, means for connecting said ground-engaging means with said frame whereby raising and lowering the latter serves to raise and lower the cutting edge of said ground-engaging means, a hitch member adapted to receive a draft connection, means for connecting said hitch member with the forward portion of said frame, comprising a pair of downwardly converging links pivotally connected at their upper ends with said frame and at their lower ends with said hitch member, the pivot connections between said links and said frame and hitch member being so spaced that the front end of said hitch member is caused to move relative to the frame in a path of movement that extends downwardly and forwardly from the frame and then downwardly and rearwardly relative to the frame, and means for releasably connecting said hitch member with said frame for holding the hitch member connected to the frame in an upper position above the point where said path of movement extends downwardly and rearwardly relative to said frame, whereby when said hitch member is released from said frame while draft is applied to said hitch member, the forward end of said frame will automatically raise only to the point, relative to the hitch member, where the front end of the latter, in following said path of movement, reaches a point therein where said path extends downwardly and rearwardly relative to the frame, thereby automatically terminating the raising movement of said frame relative to said hitch member.

3. An agricultural implement comprising a frame, a ground-engaging means connected therewith and having a lower cutting edge, a longitudinally extending hitch member adapted to receive draft power connected thereto at its forward end, a pair of non-parallel links connecting said hitch member with the front end of said frame for generally vertical movement relative thereto, the upper ends of said non-parallel links being connected with the forward portion of said frame and the lower ends of said links being pivotally connected with said longitudinally extending hitch member, and a latch for releasably holding said hitch member in an upper position relative to said frame, the angular position of said links being such that the path of movement of the front end of said hitch member extends downwardly and forwardly from said upper position and then from a lower point downwardly and rearwardly therefrom, whereby when said latch is released the draft pull on said hitch member causes the front end of said frame to swing upwardly until the front portion of said hitch member reaches said lower point, thereby raising the cutting edge of said ground-engaging means.

4. An agricultural implement comprising a frame including a pair of rearwardly diverging frame bars, a ground-engaging means pivoted to the rear ends of said frame bars, a hitch member, non-parallel link means pivotally connected at their lower ends with said hitch member, means swingably connecting the upper portions of said links to the forward ends of said frame bars, the angular relation of said links being such that said hitch member swings downwardly and forwardly, relative to said frame, during one portion of its permissive movement relative to the frame, and then downwardly and rearwardly relative to said frame, a part at the forward end of said frame, and a latch member pivoted to the forward end of said hitch member and engageable with said part for releasably locking said hitch member in an upward position relative to said frame.

TALBERT W. PAUL.

References Cited in the file of this patent

UNITED STATES PATENTS

| Number | Name | Date |
|---|---|---|
| 1,714,118 | Armington | May 21, 1929 |
| 1,801,322 | Armington | Apr. 21, 1931 |
| 2,121,240 | Austin | June 21, 1938 |
| 2,158,340 | Spieth | May 16, 1939 |
| 2,352,466 | Arps | June 27, 1944 |
| 2,473,786 | Collins | June 21, 1949 |